3,067,053
PIGMENT COMPOSITIONS
Frank R. Tarantino, North Plainfield, N.J., assignor to American Cyanamid Company, New York, N.Y., a corporation of Maine
No Drawing. Filed July 10, 1958, Ser. No. 747,594
20 Claims. (Cl. 106—308)

This invention relates to the preparation of improved pigment compositions and those compositions, and more particularly is concerned with the preparation of pigment compositions which are particularly useful for coloring latex emulsion paints, which compositions are pigments, the individual particles of which are at least partially coated with the surface active agent, at least half of which agent is a non-ionic agent and the remainder of which is an anionic agent.

This application is a continuation-in-part of application Serial No. 506,071, entitled "Preparation of Improved Pigment Compositions," filed May 4, 1955, and now abandoned.

Latex emulsion paints are in widespread use. Usually a butadiene-styrene, or polyvinyl acetate, or an acrylic type latex or an alkyd emulsion latex is used as the base to which a pigment is added as the colorant. Due to difficulties encountered in incorporating the pigment uniformly throughout the latex, various pigment dispersants and/or wetting agents are commonly added to the system. The usual procedure is to combine a surface active agent with a dispersing aid or thickener, such as a solution of sodium carboxymethylcellulose in a mixture. Dry powdered pigment, such as phthalocyanine blue, is added followed by water and additional dry pigment is sifted in. The mixture is mixed in a suitable agitator and then ground by passage over a three-roller mill. The resulting paste is then used to pigment or tint the latex paint by stirring the paste into the latex or latex tinting base. The above procedure is described, for example, on page 917, Official Digest, December 1953.

One of the most important difficulties which have been encountered with pastes prepared by this procedure, however, is that they must be subjected to a fine milling operation if a high color value is to be obtained economically.

In the past, pigments which have been added to latices have required a drastic milling operation such as ball milling or three-roll milling to obtain reasonable color values. Such milling is not feasible at the point of use, but is necessarily performed in a paint factory and requires the use of costly equipment, and valuable time and effort. The power requirements of such milling are high. A system is required in which sufficient energy can be introduced into the system to accomplish the desired dispersion. Hand mixing, shaking, or simple agitation with a power driven stirrer is not sufficient to accomplish this dispersion. The color value of such a pigment increases with the amount of milling to a maximum, which it approaches asymptotically. Accordingly, the amount of milling affects the color, and drifts in color value may occur.

The present invention is based upon the discovery that by carrying out the novel sequence of steps hereinafter described, the so-prepared pigment compositions, either as dry powders, pastes, or slurries, are compatible not only with the butadiene-styrene latex but also with polyvinyl acetate, acrylic and alkyd emulsion latices. Of equal importance is the fact that the novel process results in a water-dispersible product, either as a dried pigment or in paste form, or diluted with water to form a slurry, which is a colorant of outstanding strength and color value and as such permits the production of strongly tinted or colored paints based on these latices.

The novel compositions are concentrated products which are stable on storage. In addition, they are easily dispersed into the latex system by a simple mixing or stirring operation and need not be milled. The color value is stable after a minimum of stirring.

Briefly, the present invention involves deflocculating a water-wet pigment presscake by the addition thereto with stirring of a non-ionic surface active agent. An anionic agent may also be added. Water may then be added to the deflocculated presscake and a thickener, such as sodium carboxymethylcellulose may be added. The resulting mixture is stirred until a smooth uniform paste is obtained. The paste or slurry may be concentrated to the desired degree or may be dried to a constant weight. The dried product, either as such or when pasted in water, may be used to tint a white latex paint, such as one containing titanium dioxide in a butadiene-styrene latex, with strikingly improved color values. That is to say, at equal pigment concentration, the improved compositions of this invention have a tinting strength which is greater by approximately 30% or more than an identical pigment prepared by the above-described prior art method. This exceptional result is only obtainable with the particular combination of a non-ionic agent or a non-ionic and an anionic agent applied to a pigment presscake as above described. The present invention is not limited to any particular theory of action, but it is felt that the agents are adsorbed at the pigment vehicle interface and thus prevent agglomeration or flocculation of the ultimate pigment particles. The presence of the surface active agent insures ease of dispersion in the latex emulsion.

The present invention may be practiced with both organic and inorganic pigments which are desirable in preparing latex paints. By this is meant that such organic pigments as phthalocyanine blue, phthalocyanine green, naphthol scarlet (diazotized 2-methyl-5-nitroaniline coupled to naphthol AS), toluidine red toner (diazotized m-nitro-p-toluidine coupled to beta-naphthol), Hansa yellow (diazotized 4-amino-2-nitrotoluene coupled to acetoacetanilide), and Pigment Green B (a nitroso beta-naphthol iron complex), and such inorganic pigments as titanium dioxide, iron blue, ultramarine blue and chrome yellow may be successfully treated by the process of this invention and used with great effectiveness as colorants for latex emulsion paints.

The choice of nonionic agent that may be used to deflocculate the pigment presscake is relatively critical. There are many types of nonionic agents as described in an article by John W. McCutchen, "Synthetic Detergents," appearing in Soap and Sanitary Chemicals, July-October 1952. In general most of these nonionic agents give some improvement over a system in which no agent has been used. However, preferably those nonionics are used which have a high degree of hydrophilicity. Specifically agents having HLB values (hydrophilic-lipophilic balance) greater than 4.0 give best results. This HLB value is defined by William C. Griffen in an article entitled "Calculation of HLB Values of Non-Ionic Surfactants," published in the December 1954 issue of the Journal of the Society of Cosmetic Chemists. The use of the nonionic agent is essential to the improved tinting strength shown by the present pigments. The non-ionic agent insures ease of dispersibility and prevents caking. When an anionic agent is used together with the nonionic agent it functions as an aid to promote more rapid wetting of the pigment by water but does not promote by itself the dispersion of the pigment. That is, if only the anionic agent were present the dried product obtained would be weak in some latex paints and completely incompatible in other latex paints, while the paste products might be suitable in butadiene-styrene latex paints but weak or incompatible in paints based on other latices alone.

While the use of some anionic agent gives improved dispersibility, it is preferred that only a small quantity of the anionic agent be used, as the use of a small quantity gives products of improved washability and scrub resistance. The amount by weight of the anionic agent should at all times be less than half of the total of nonionic and anionic agent used. If over 9% of the weight of the pigment is anionic agent, the scrub resistance is below that presently regarded as desirable, particularly in polyvinyl acetate and butadiene-styrene latices. A larger amount of anionic agent may be used with pigments added only in small quantity, as the lack of scrub resistance is in part a function of the anionic agent concentration in the dried paint film.

In common with most surface active agent uses, certain materials give better results than do others. Consequently, the preferred nonionic surface active agents which give the best results include: Alkyl aryl polyether alcohols which may be conveniently prepared by a condensation of ethylene oxide with an alkyl phenol, containing from 4 to 12 carbons in the alkyl group. Commercially available products usually are mixtures with an average of 3 to 30 or more moles of ethylene oxide condensed per mole of alkyl phenol. The number of moles of ethylene oxide represents a statistical distribution, as in any given commercial product individual molecules may contain a wide distribution of polyethylene oxide chain lengths. Among the agents in this group which are presently commercially available are the isooctylphenyl ethers of polyethylene glycol with an average of 5 to 12 or more moles of ethylene oxide such as the "Tritons" of Rohm and Haas, the X–45 having about 5 moles, the X–114 having about 7 moles, and the X–100 having about 9 to 10 moles of ethylene oxide. Other isooctylphenol ethylene oxide adducts include: "Igepal" CTA 639 and "Igepal" CTA 630 sold by General Aniline. Among the nonyl phenol ethylene oxide adducts are the "Igepal" CO series 530, 610, 710, 730, 850, and 880 of General Aniline. The first figure in the number represents the approximate number of moles of ethylene oxide per mole of nonyl phenol. Similar products are the "Surfonics" of the Jefferson Chemical Company; the "Renexes" of the Atlas Powder Company. Variants in the alkyl group and number of moles of ethylene oxide includes a number of "Tergitols" of Union Carbide Company; "Aerosol® NI" of American Cyanamid Company; "Advawet" of the Advance Solvent and Chemical Company; "Agrimul 70–A" and "Nopco 1525" of the Nopco Chemical Company; "Dispersant NI–W" and "NI–O" of Oronite Chemical Company; and "Energetic W–100" of Armour & Co. Also, among the preferred agents are polyethylene glycol alkyl thioethers such as the "Nonics" 218, 324, 260, and 261 of Sharples Chemical Company; and the "Steroxes" of the Monsanto Chemical Company. Also, the ethylene oxide condensates with polyoxypropylene such as the "Pluronics" L–61, L–44, L–62, L–64, P–75, and F–68 sold by the Wyandotte Chemical Corporation.

The amount of nonionic agent that may be used is a factor of prime importance as too low a quantity of agent does not produce a high enough strength value of the pigment composition for practical economic usage, and with too large a quantity of agent, while it may give better strength values, the resulting products could not be obtained as dry powders but only as pasty solids which would add too much dispersant to the finished paints and which would lower the cured film scrub resistance value.

Consequently, I prefer to use from about 4% to about 65% of the surface active agents by weight based on the weight of dry pigments, a preferred quantity being of the order of 7% to 45% by weight of dry pigment. While the preferred amount of surface active agent falls within the range of 4% to 65%, the preferred amount is actually controlled by the specific surface area of the pigment. Pigments of very small particle size (large surface areas) require the larger amounts of agents, and vice versa. At least half of the surface active agent is a nonionic agent. All of the agent may be one or more nonionic agents. The anionic agents which give increased speed of dispersion, particularly with slurries, may be any of the standard types which are known to the art. The lists by McCutchen mentioned above is accepted as standard in the industry although new agents are being added to these lists and a large number of old agents are constantly appearing under new trade names.

Whereas any of the anionic agents may be used, the best results are obtained with the alkyl aryl sulfonates. Such compounds as the mixed isopropylnaphthalene sulfonates which may be used in the form of the ammonium or alkali metal salts are very effective. Butyl or methyl groups may be used as substituents on the aryl rings. Among the commercially available products of this nature are: Aerosol® OS of the American Cyanamid Company; "Alkanol" B and 189–S of Du Pont; "Daxad" 11, 11KS and 23 of Dewey and Almy; "Nacconol NRSF" of National Aniline; "Nekal BX–78" of General Aniline; "Parnol 85" of Jacques Wolf and Company; "Sorbit AC" of Geigy Industries; "Tamol N" of Rohm and Haas; and "Ultrawet K" of Atlantic Refining Company. The salts of sulfate esters of alkyl phenoxy polyoxyethylene ethanol are also good. These compounds are frequently sold as the sodium or ammonium salts although other salts which are available may be used. For obvious reasons the more economically priced commercially available anionic agents are normally used although more exotic and less obtainable anionic agents are theoretically as satisfactory.

The adjustment of the relative ratio of anionic to nonionic agent depends to some extent on the purpose for which the pigment is to be used and the amount of pigment which is to be used in attaining the desired color value in the final paints. As previously indicated, with very dilute tints a comparatively larger percent of an anionic agent in the pigment may be used without causing the final paint to lose its scrub resistance, because so little pigment is used. On the other hand, with more highly colored paints, it is preferred that the amount of anionic agent be fairly small. In its preferred embodiment the present pigment may be used for both purposes.

The present pigment compositions may be used as a powder, a slurry, or a paste. Where the ratio of surface active agent is towards the lower ranges and no water is present, the composition is a powder. Where the concentration of surface active agent is higher, there may be sufficient so that the pigment composition is a paste. Either the powder or the paste may be diluted with water to form a slurry or a paste depending upon the amount of water added, or in the formation of the pigment composition, water may be allowed to remain present rather than drying the composition. As is obvious, a comparatively large amount of water adds to the shipping cost and because part of the water may evaporate and thus change the apparent strength, the use of a water-containing slurry or paste is somewhat complicated by the fact that it may be more difficult to obtain uniform color values. If the slurry is protected against evaporation of water and hence a uniform color value maintained, the slurry is extremely convenient for use with latices.

A slurry concentrated to a solids content of 30 to 50% is a good compromise between the shipping costs entailed by more dilute slurries, and the slight additional stirring required.

The tinctorial strength of the pigment appears to be essentially constant until the concentration of the surface active agents approaches the 30% level after which some correction in tinctorial strength is necessary because of the amount of surface active agents present. The real strength based on the amount of actual pigment in the composition does not fall off but instead tends to increase.

The use of the mixed nonionic-anionic agents gives advantages in rate of dispersion. This advantage is more marked with some compositions than with others.

Suitable thickeners may be employed in preparing the novel pigment compositions. However, these materials are used only to control the viscosity of the pastes or slurries but have no effect on the final tinctorial intensity of the pigment composition. If a dry product is to be obtained the thickener should be limited to those types of inert products which are either pigmentary or cellulosic in nature and yet are easily wettable or dispersible after drying. Thickeners which are effective in achieving the above-described result are sodium carboxymethylcellulose, Jaguar gum, aluminum silicates, magnesium-potassium-aluminum silicates such as mica and water-soluble vinyl type polymers such as polyacrylamide. Should a product in the wet state, such as a slurry or a paste, be desired, then other thickeners such as casein and similar proteins or even paint latices may be used.

The above thickeners may be employed in amounts ranging from about 0.8% to about 6% by weight of the dry pigment. If the pigment composition is retained as a slurry, the amount of thickening agent should be no greater than 3%. However, if the material is to be dried to a paste or powder, up to 6% thickener is tolerated. If larger amounts are used, they may lead to a decrease of the ultimate pigment strength and reduction of the concentration of the final products.

The powders, slurries and pastes prepared in accordance with the present invention are very readily dispersible. Rather than requiring a pre-dispersion with a mill they may be dispersed in a latex by merely adding to the latex and stirring by hand. A paddle or simple propeller agitator gives sufficient energy input to disperse the present pigments and attain substantially a maximum tint strength in a comparatively short time. The ease of dispersion and the stability of color are greater than previously known pigment concentrates. The amount of energy input required to develop the maximum strength and the rate of strength development on stirring point to the outstanding characteristics of the present pigment composition. The rate of strength development is more easily measured and points out the marked advantages.

The pigments of the present invention may be used as concentrates by a dealer who is thus required to maintain a major inventory only of white latex paint and the particular choice of colors for specific applications may be attained by adding the present pigment compositions in small quantities at the time of use. The dispersion of the color in the latex may be accomplished by paddle stirring by the painter at time of use.

One of the reasons for the preference for latex paints is their freedom from organic solvents. It is desirable that pigments used in these latices also be free from organic solvents.

The freedom from organic solvents permits use of the present pigments to color latices used where explosion hazards would otherwise exist and permits the use where odors would be a problem.

The invention will be described in greater detail in conjunction with the following specific examples in which the parts are by weight unless otherwise specified.

EXAMPLE 1

703 parts of 60° C. tap water and 17.86 parts of "Triton X-100" (isooctyl phenyl ether of polyethylene glycol, about 9 to 10 moles ethylene oxide) were charged into a 15-gallon "Kady" mill and stirred. 476 parts of copper phthalocyanine blue presscake containing 100 parts real pigment were added. The mass was stirred and the pigment presscake was deflocculated in 10 minutes. Stirring was continued for 1 hour. 7.12 part of sodium carboxymethylcellulose was added and the stirring continued for an additional 6 hours. The resulting paste was air-dried at 60° C. to a constant weight in 24 hours. The dried product was micropulverized through a 1/16" diameter hole screen.

This powder, containing 80% real pigment, was evaluated for tinting properties as such in various latex paints formulated with titanium dioxide.

Evaluations were made as follows:

125 parts of the pigment powder just described and 87 parts of water were charged and mixed in a suitable change-can mixer in accordance with the method described on page 917 of the "Official Digest" December 1953. The resulting paste was then divided into two equal portions, labelled A and B. One portion (B) was given one pass over a 3-roller ink mill with pressure setting of 75 pounds.

For comparison, a paste by the prior art procedure was made as follows:

100 parts commercial copper phthalocyanine dry pigment, 18.15 parts "Triton X-100," 6.35 parts sodium carboxymethylcellulose (solubilized to an 8% solution), and 87.0 parts distilled water were charged and mixed in a change-can mixer as used above in the preparation of pastes A and B. This paste was divided into two portions, labelled C and D, one portion of which (D) was given one pass over the 3-roller mill as above.

The above tinting pastes were then added to preparations of commercial types of titanium dioxide latex paints in quantities of 1 part of copper phthalocyanine blue pigment to 30 parts of titanium pigment. These mixtures were hand stirred for 15 minutes to a smooth uniform non-streaking tinted paint. Comparative drawdowns of 0.005" film of the tinted paints on a "Morest" card were made and permitted to dry. The dried films were then evaluated for strength and tinting value. The evaluations are shown in Table I which follows.

*Table I*

STRENGTH VALUES OF PHTHALOCYANINE BLUE TINTED TITANIUM DIOXIDE LATEX PAINTS

| Pigment | Paste dispersion tool | Butadiene-styrene, percent | Polyvinyl acetate, percent | Polyacrylates, percent |
|---|---|---|---|---|
| Product of Example 1, A | Mixer | 217 | 233 | 233 |
| Product of Example 1, B | Mill | 228 | 245 | 238 |
| Commercial dry pigment, C | Mixer | 100 | 100 | 100 |
| Commercial dry pigment, D | Mill | 185 | 176 | 190 |

EXAMPLE 2

21.9 parts of "Triton X-100" (isooctyl phenyl ether of polyethylene glycol), 380 parts Hansa Yellow presscake containing 67 parts real pigment were charged into a 15-gallon "Kady" mill and stirred. The presscake was deflocculated quickly and 190 parts more of Hansa Yellow presscake containing 33 parts real pigment were added and deflocculated with continued stirring. 1.23 parts sodium carboxymethylcellulose were added and the stirring was continued for 5 hours. The temperature of the paste during this stirring period was maintained at 44° C. or lower. The paste was air-dried at 60° C. to a constant weight in 24 hours. The dried product was micropulverized through a 1/16" diameter hole screen.

This powder, containing 81.2% real pigment, was evaluated for tinting properties in various latex paints formulated with titanium dioxide.

The evaluation procedure followed was similar to that described in Example 1, with the finished paints being tinted to contain 1 part of Hansa Yellow pigment to 20 parts of titanium dioxide pigment. These evaluations are shown in Table II as follows:

Table II
STRENGTH VALUES OF HANSA YELLOW TINTED TITANIUM DIOXIDE LATEX PAINTS

| Pigment | Paste dispersion tool | Butadiene-styrene, percent | Polyvinyl acetate, percent | Polyacrylates percent |
|---|---|---|---|---|
| Commercial dry pigment | Mixer | 100 | 100 | 100 |
| Do | Mill | 104 | 102 | 103 |
| Product of Example 2 | Mixer | 147 | 149 | 149 |
| Do | Mill | 147 | 151 | 151 |

EXAMPLE 3

The preparation of other organic pigments treated with various types of nonionic agents and thickeners starting with water-inert presscakes was carried out following the procedure of Examples 1 and 2. As in Examples 1 and 2, the resulting treated slurries were then either tested as is or dried to a constant weight at 60° C. in 24 hours. The treated dried pigments were crushed by rolling in pebble mill (1 to 2 hours) and then placed through a No. 20 mesh screen.

The treated powders were evaluated by first being pasted with water in a mortar with a pestle, the resulting pastes being used to tint titanium dioxide butadiene-styrene paints. Comparative strength data of these treated pigment pastes were obtained versus pastes made in a similar manner with untreated dried pigment, dispersant, thickener and water, and untreated dried pigment with water alone. Data obtained from these mortar and pestle paste tests have been correlated with and found to be equal to those tests made from change-can, milled pastes. Material usage as well as comparative strength data of the treated pigments are shown in Table III which follows:

corporated into the necessary remaining formulated paint materials and evaluated.

Comparative data obtained showed that this treated dry pigment produced a paint with a slightly lower consistency, considerably better ease of dispersion and much better resistance to pigment floating than the original untreated dried pigment which was also evaluated into a similar paint formulation.

EXAMPLE 5

553 parts Hansa Yellow presscake containing 100 parts real pigment, 11.2 parts "Triton X–100" (isooctyl phenyl ether of polyethylene glycol), 11.2 parts "Daxad No. 23" (polymerized sodium salts of substituted benzoid alkyl sulfonic acids) were charged into a suitable vessel and stirred until the pigment presscake was deflocculated. 2.5 parts sodium carboxymethylcellulose were added and the mass stirred for 7 hours with the temperature being held below 46° C. during the stirring period. The treated paste was air-dried at 60° C. to a constant weight in 24 hours.

The dried product was crushed by rolling in a pebble mill and then passed through a No. 20 mesh screen. The resulting powder was then evaluated by various methods for ease of dispersion.

These evaluations were made by tinting various titanium dioxide latex paints with both the treated and untreated Hansa Yellow powders. The evaluations are shown in Table IV which follows. The paste used as standard for the various comparisons was prepared by adding the agents used for Example 5 powder, to a dry untreated pigment and pasting this mixture with sufficient water in a mortar with a pestle to give a fluid stirrable paste.

Table III

| Pigment (presscake) | Pigment amount (parts) real | Nonionic agent | Amount (parts) | Thickener | Amount (parts) | Strength values with butadiene-styrene TiO₂ paint, percent | |
|---|---|---|---|---|---|---|---|
| | | | | | | A | B |
| Copper phthalocyanine blue | 100 | Triton X–100 | 23.7 | Aluminum silicate | 42.1 | 500 | 750 |
| Do | 100 | do | 15.8 | do | 50.0 | 250 | 520 |
| Do | 100 | Jefferson's NY–126 | 18.9 | do | 48.7 | 285 | 900 |
| Do | 100 | Nonic 218 | 18 | Sodium carboxymethylcellulose | 7.0 | 530 | 880 |
| Do | 100 | Sterox SE | 18 | do | 7.0 | 550 | 930 |
| Do | 100 | Pluronic L–64 | 18 | do | 7.0 | 140 | |
| Do | 100 | Triton X–100 | 22.5 | Polyacrylamide | 2.5 | 550 | 930 |
| Toluidine red toner | 100 | do | 27 | Sodium carboxymethylcellulose plus aluminum silicate | 8.11 | 145 | 300 |
| Hansa Yellow (C) | 100 | do | 19.3 | Sodium carboxymethylcellulose | 1.20 | 250 | 1,050 |
| Do | 100 | do | 19.7 | Jaguar gum | 1.23 | 250 | 1,050 |
| Copper phthalocyanine green | 100 | do | 18 | Sodium carboxymethylcellulose | 7.0 | 140 | 718 |

Note.—A—Tinctorial strength vs. identical pigment prepared by the above-described prior art method. B—Tinctorial strength vs. Control (untreated dried pigment plus water alone). C—These products retained and evaluated in slurry form.

EXAMPLE 4

There was charged into a vessel with stirring 33 parts of warm tap water, 10 parts of "Triton X–100" (isooctyl phenyl ether of polyethylene glycol), and press-cake containing 100 parts of a rutile titanium dioxide (real). Stirring was continued and then there was added 5 parts of sodium carboxymethylcellulose. The paste was stirred for 6.5 hours adding 83.5 parts tap water in 16.7 parts aliquots to retain stirring flow during the stirring period.

The resulting paste was then air-dried to a constant weight at 60° C. in 24 hours. The dried product was crushed by rolling for 2 hours in a pebble mill, extracted and passed through a No. 20 mesh screen.

The dried powder obtained was formulated into a polyvinyl acetate emulsion paint as follows. It was first pasted with water in a mixing device. The paste was then passed over a 3-roller ink mill. It was finally in-

Table IV
EVALUATION OF TREATED HANSA YELLOW POWDER IN VARIOUS TITANIUM DIOXIDE LATEX PAINTS

| | Titanium dioxide paints | | |
|---|---|---|---|
| | Butadiene-styrene, percent | Polyvinyl acetate, percent | Polyacrylate, percent |
| Commercial dry pigment mortar-pestle paste | 100 | 100 | 100 |
| Example 5—Powder mortar-pestle paste | 300 | 300 | 300 |
| Example 5—Powder [1] hand stirred (15 minutes) | 180 | 180 | 180 |
| Example 5—Powder [1] "Lightnin" mixer stirred (20 minutes) | 200 | 200 | 200 |

[1] These evaluations were prepared by stirring the dry powder directly into the paints without any pre-wetting or dispersing action.

EXAMPLE 6

357 parts copper phthalocyanine blue presscake containing 100 parts of real pigment was charged into a suitable vessel. 11.2 parts "Triton X-100" (isooctyl phenyl ether of polyethylene glycol) and 11.2 parts Aerosol® OS (isopropyl naphthalene sodium sulfonate) dispersed in 250 parts tap water were added to the presscake with stirring until the presscake was deflocculated. 2.5 parts sodium carboxymethylcellulose were added and the stirring continued for 7 hours.

The resulting paste was divided into two portions. One portion, A, was retained in slurry form. The other portion, B, was air-dried at 60° C. to a constant weight in 24 hours. The dried product was crushed by rolling in a pebble mill for 1 hour, extracted and passed through a No. 20 mesh screen. Both Samples A and B were then evaluated by various methods for ease of dispersion.

The evaluations were made by tinting various titanium dioxide latex paints with both the treated and untreated copper phthalocyanine blue samples. The evaluations are shown in Table V which follows:

The paste used as standard for the various comparisons was prepared by adding the agents used for Example 6 powder to a dry untreated pigment and pasting this mixture with sufficient water in a mortar with a pestle to give a fluid stirrable paste.

Table V

EVALUATIONS OF TREATED COPPER PHTHALOCYANINE BLUE SAMPLES IN VARIOUS TITANIUM DIOXIDE LATEX PAINTS

|  | Titanium dioxide paints | | |
| --- | --- | --- | --- |
|  | Buta-diene-styrene, percent | Poly-vinyl acetate, percent | Poly-acry-late, percent |
| Commercial dry pigment mortar-pestle paste | 100 | 100 | 100 |
| Example 6—Powder B, mortar-pestle paste | 700 | 400 | 700 |
| Example 6—Powder B,[1] hand stirred (15 minutes) | 670 | 150 | 700 |
| Example 6—Powder B,[1] "Lightnin" mixer stirred (20 minutes) | 700 | 300 | 700 |
| Example 6—Slurry A | 600 | 370 | 700 |

[1] These evaluations were prepared by stirring the dry powder directly into the paints without any pre-wetting or dispersing action.

EXAMPLE 7

358 parts copper phthalocyanine blue presscake containing 100 parts of real pigment were charged into a suitable vessel. 18 parts "Igepal CTA-639" (a polyoxyethylated nonyl phenyl, about 8.5 moles ethylene oxide), dispersed in 300 parts of tap water were added and the mixture stirred until the presscake was deflocculated. 7.0 parts sodium carboxymethylcellulose and 300 parts more of tap water were added and stirring continued for 6.5 hours. The stirred paste was then air-dried at 60° C. to a constant weight in 24 hours. The dried product was crushed by rolling in a pebble mill for one hour and passed through a No. 20 mesh screen. The crushed powder was evaluated by various methods for ease of dispersion.

These evaluations were made by tinting various titanium dioxide latex paints with both the treated and untreated copper phthalocyanine blue samples. The evaluations are shown in Table VI which follows.

The paste used as standard for the various comparisons was prepared by adding the agents used for Example 7 powder to a dry untreated pigment, and pasting this mixture with sufficient water in a mortar with a pestle to give a fluid stirrable paste.

Table VI

EVALUATIONS OF A NONIONIC AGENT TREATED COPPER PHTHALOCYANINE BLUE SAMPLE IN VARIOUS TITANIUM DIOXIDE LATEX PAINTS

|  | Titanium dioxide paints | | |
| --- | --- | --- | --- |
|  | Buta-diene-styrene, percent | Poly-vinyl acetate, percent | Poly-acry-late, percent |
| Commercial dry pigment mortar-pestle paste | 100 | 100 | 100 |
| Example 7—Powder mortar-pestle paste | 200 | 185 | 195 |
| Example 7—Powder "Lightnin" mixer stirred[1] | 180 | 180 | 186 |
| Example 7—Powder hand stirred[1] | 175 | 125 | 184 |

[1] These evaluations were prepared by stirring the dry powder directly into the paints without any pre-wetting or dispersing action.

EXAMPLE 8

78 parts of 15% ammonium caseinate solution (equal to 11.7 parts casein), 10 parts "Nonic 300" (polyethylene alkyl phenyl ether), 182 parts of copper phthalocyanine green press cake containing 100 parts real pigment and 63.3 parts water were charged into a suitable vessel and stirred until the presscake was deflocculated.

The resulting paste was then evaluated for tinting properties by hand stirring it into the various titanium dioxide latex paints and compared versus a standard paste prepared wtih dried pigment and the same amount of dispersants. This standard paste was prepared by pasting the dried pigment with the dispersants and the required amount of water in a mortar with a pestle. Evaluations are shown in Table VII which follows.

Table VII

EVALUATION OF TREATED COPPER PHTHALOCYANINE GREEN PASTE IN VARIOUS TITANIUM DIOXIDE LATEX PAINTS

|  | Titanium dioxide paints | | |
| --- | --- | --- | --- |
|  | Buta-diene-styrene, percent | Poly-vinyl acetate, percent | Poly-acry-late, percent |
| Commercial dry pigment mortar-pestle paste | 100 | 100 | 100 |
| Example 8—Treated paste | 210 | 200 | 204 |

EXAMPLE 9

450 parts of copper phthalocyanine presscake, contains 100 parts real, and the rest water, and 21 parts of "Igepal CTA 639" (isooctyl phenyl ether of polyethylene glycol, about 8.5 moles of ethylene oxide) and 15.8 parts of "Alipal CO 436" containing 9.2 parts of the ammonium salt of the sulfate ester of alkyl aryl polyoxyethylene ethanol in isopropyl alcohol and 1.3 parts of antifoam (G.E. Silicone SS-66) are charged to an Eppenbach homogenizer, and mixed therein by hand until fluid, then mixing is continued at 6500 r.p.m. in the homogenizer. Samples are taken at the times indicated, and the strength of the slurry evaluated by mixing a sample containing 0.568 gram of real pigment with 60 grams of Sherwin-Williams' Shasta-White for 10 minutes at a speed of 6500 r.p.m. in a 2 ounce glass jar stirred with a "Lightnin" propeller agitator. The tinctorial intensity is measured spectrophotometrically. A comparison column shows the strength of the pigment produced from the same presscake dried and added in dry form with enough water to give the same composition of product. This table shows the importance of using a presscake even with the present combination of agents to get high strengths.

| Time, minutes | Percent tinctorial strength[1] From— | |
|---|---|---|
| | Presscake | Dry pigment |
| 15 | 97 | 43 |
| 30 | 98 | 53 |
| 45 | 96 | 64 |
| 60 | 98 | 71 |
| 90 | 99 | 76 |
| 120 | 99 | 85 |
| 180 | 100 | 91 |

[1] Measured by spectrophotometric method using presscake—180 minutes as 100%. This standard was also used for the other tinctorial strengths reported in the following examples.

The product of the present invention with two hours stirring is used as a standard for comparison.

EXAMPLE 10

441 parts of phthalocyanine blue presscake (100 parts real) was mixed with 36.8 parts "Igepal CTA–639" (isooctyl phenyl ether of polyethylene glycol, 8.5 moles ethylene oxide) and 1.1 parts "Silicone SS–66," a silicone antifoam. The material was mixed by hand until the consistency was reduced to a point that it could be poured, and milled in an Eppenbach homogenizer at 6500 r.p.m. at a temperature less than 40° C. After 30 minutes of milling, the sample was removed. Half of this sample was retained as a slurry (A–1), and the remainder was dried to a powder (A–2). Milling was continued for a total of 3 hours, at which time the remaining sample was divided into two parts; half was dried as above at 60° C. to a constant weight (A–4), and the remainder retained as a slurry (A–3).

The tinctorial strengths of these samples rated against a slurry prepared by the procedure of Example 9 with 2 hours' stirring, and using the same procedure for testing was as follows:

| | Percent |
|---|---|
| A–1 | 97 |
| A–2 | 80 |
| A–3 | 94 |
| A–4 | 70 |

EXAMPLE 11

Quantities and procedure of this example are identical to those used in Example 10, with the exception that 47.8 parts of "Igepal CTA 639" (isooctyl phenyl ether of polyethylene glycol, 8.5 moles ethylene oxide) was used. The testing procedure is also identical to that used in Example 10, and the results are listed below.

| | Percent |
|---|---|
| B–1 | 90 |
| B–2 | 75 |
| B–3 | 90 |
| B–4 | 80 |

EXAMPLE 12

The precedure of Example 9 was followed except that 65 parts of "Igepal CTA 639" (isooctyl phenyl ether of polyethylene glycol, 8.5 moles ethylene oxide) was used. The results are tabulated below:

| | Percent |
|---|---|
| C–1 | 100 |
| C–2 | 85 |
| C–3 | 97 |
| C–4 | 80 |

EXAMPLE 13

Naphthol scarlet presscake containing 100 parts real of naphthol scarlet and the remainder water, 20 parts of "Igepal CTA 639" (isooctyl phenyl ether of polyethylene glycol, 8.5 moles ethylene oxide) and 15.8 parts of "Alipal CO 436" (anionic agent) and 1.3 parts of antifoam were charged to an Eppenbach homogenizer and mixed by hand until fluid, then at 6500 r.p.m. in the homogenizer. A strong naphthol scarlet pigment is obtained as a slurry which can be easily dispersed by hand stirring in either water or emulsion latex paints. A part of the slurry is dried at 60° C. to form a paste containing 50% water and the remainder is dried to constant weight at 60° C., and the powder so formed ground in a ball mill until it will pass a 20 mesh screen. Both the paste and the powder are readily re-dispersible in latex emulsion paints.

EXAMPLE 14

The procedure of Example 13 was repeated using a pigment Green B presscake (iron chelate of nitrosobeta-naphthol). The same type of dispersible pigments were obtained.

EXAMPLE 15

A rutile titanium dioxide pigment presscake containing 100 parts of real titanium dioxide, 100 parts additional water to dilute, 4 parts of "Igepal CTA 639," and 1 part of antifoam is mixed by hand until fluid, and then mixed in an Eppenbach homogenizer for 15 minutes. A readily aqueous dispersible titanium pigment is thus obtained.

Variations on the above examples within the scope of the appended claims are obvious to those skilled in the art. For example, mixtures of nonionic or anionic agents may be used, or mixtures of pigments may be used. The types of mills, and milling conditions may be varied. Presscakes which are wetter or drier may be used, with appropriate adjustments of added water, or drying conditions.

I claim:

1. A process of preparing an improved pigment composition for use in coloring aqueous latex emulsion base paints which comprises adding about 9 parts of iso-octyl phenyl ether of polyethylene glycol and 9 parts of isopropylnaphthalene sodium sulfonate dispersed in water to 80 parts of copper phthalocyanine blue pigment, as a presscake, dispersed in water, stirring so as to deflocculate the pigment, adding 2 parts of sodium carboxymethylcellulose and continuing the stirring of the deflocculated pigment until a smooth uniform paste is obtained.

2. The process according to claim 1 in which the paste is dried and thereafter powdered.

3. A strong water-dispersible copper phthalocyanine blue pigment suitable for coloring aqueous latex emulsion base paints consisting essentially of copper phthalocyanine blue pigment particles coated with about 9 parts of iso-octyl phenyl ether of polyethylene glycol, about 9 parts of isopropylnaphthalene sodium sulfonate and about 2 parts of sodium carboxymethylcellulose to 80 parts of copper phthalocyanine, said pigment having the characteristic of dispersing rapidly and uniformly when added to water or a water base emulsion type paint which paint has a pH at, above, or below neutral.

4. The process of preparing an improved pigment composition free from non-aqueous solvents for use in coloring aqueous latex emulsion base paints which consists essentially of: in the absence of a non-aqueous solvent, adding between about 4 and 65% by weight based on the weight of dry pigment of a surface active agent at least one-half of which is a nonionic agent and the remainder of which between 0% and 9% is an anionic agent, said nonionic agent being selected from the group consisting of alkyl aryl polyether alcohols, polyethylene glycol alkyl thioethers, and polyoxyethylene-polyoxypropylenes and the anionic agent is selected from the group consisting of alkyl aryl sulfonates, and salts of sulfate esters of alkyl-phenoxy-polyoxyethylene ethanol, to a pigment presscake consisting essentially of pigment particles and water with stirring so as to deflocculate the pigment, and continuing the stirring of the deflocculated pigment until a smooth, uniform paste is obtained.

5. The process of claim 4 in which the paste is dried, and thereafter powdered.

6. The process of claim 4 in which the paste is concentrated to a solids content of 30 to 50%.

7. The process according to claim 4 in which between about 0.8% and 6% by weight of the dry pigment of a thickener selected from the group consisting of sodium carboxymethylcellulose, Jaguar gum, aluminum silicates, magnesium-potassium-aluminum silicates and water-soluble vinyl polymers is added.

8. The process according to claim 4 in which the pigment is copper phthalocyanine blue.

9. The process according to claim 4 in which the pigment is naphthol scarlet.

10. The process according to claim 4 in which the pigment is toluidine red toner.

11. The process according to claim 4 in which the pigment is Hansa Yellow.

12. The process according to claim 4 in which the pigment is pigment Green B.

13. A strong water-dispersible pigment free from non-aqueous solvents suitable for coloring aqueous latex emulsion base paints consisting essentially of a pigment the individual particles of which are coated with a surface active agent, the amount of surface active agent being between 4% and 65% by weight, based on the weight of dry pigment content, at least half of said agent being a nonionic surface active agent with a HLB value greater than 4, and the remainder of which between 0% and 9% is an anionic surface active agent with an HLB value greater than 4, said pigment having the characteristic of dispersing rapidly and uniformly when added to water or a water-base emulsion type paint which paint has a pH at, above, or below neutral.

14. The pigment composition of claim 13 which is substantially free from water, and in dry powder form.

15. The pigment composition of claim 13 in which the content of surface active agent and water is sufficient to form a composition at least as thin as a paste.

16. The process of preparing a strong water-dispersible pigment free from non-aqueous solvents suitable for coloring aqueous latex emulsion base paints, and which pigment disperses rapidly and uniformly by hand stirring when added to water or a water-base emulsion-type paint which consists essentially of: in the absence of a non-aqueous solvent, adding to a water-wet pigment presscake between about 4 and 65% by weight of the dry pigment of a surface active agent, at least half of said agent being a nonionic surface active agent with a HLB value greater than 4, and the remainder of which between 0% and 9% is an anionic surface active agent with an HLB value greater than 4, stirring so as to deflocculate the pigment and coat the individual pigment particles with said surface active agent, and form a smooth, uniform paste.

17. The process of claim 16 in which the composition is dried and thereafter powdered.

18. The process of claim 16 in which the composition is dried to a paste having a 50 to 70% water content.

19. The process of preparing a strong water-dispersible copper phthalocyanine blue pigment suitable for coloring aqueous latex emulsion base paints, and which pigment disperses rapidly and uniformly by hand stirring when added to water or a water-base emulsion-type paint which consists essentially of adding from 4 to 65% by weight of the dry phthalocyanine pigment of a surface active agent, at least half of said agent being an alkyl aryl polyether alcohol, and the remainder of which between 0% and 9% is an alkyl aryl sulfonate, to a water-wet copper phthalocyanine blue presscake, stirring so as to deflocculate the pigment and coat the individual pigment particles with said surface active agent, and form a smooth, uniform paste.

20. A strong water-dispersible pigment free from non-aqueous solvents suitable for coloring aqueous latex emulsions base paints consisting essentially of a pigment, the individual particles of which are coated with at least one surface active agent, the amount of surface active agent being between 4% and 65% by weight, based on the weight of dry pigment content, at least half of the agent being a nonionic surfactant selected from the group consisting of alkyl aryl polyether alcohols, polyethylene glycol alkyl thioethers, and polyoxyethylene-polyoxypropylenes and the remainder of which between 0% and 9% is an anionic agent selected from the group consisting of alkyl aryl sulfonates, and salts of sulfate esters of alkyl-phenoxy-polyoxyethylene ethanol, said pigment having the characteristics of dispersing rapidly and uniformly when added to water or a water base emulsion type paint while paint has a pH at, above, or below neutral, said pigment being prepared by the method of claim 4.

References Cited in the file of this patent

UNITED STATES PATENTS

| | | |
|---|---|---|
| 1,979,469 | Johnson | Nov. 6, 1934 |
| 2,623,827 | Moos | Dec. 30, 1952 |
| 2,637,711 | Auer | May 5, 1953 |
| 2,727,827 | Chertkoff | Dec. 20, 1955 |
| 2,731,338 | Fike et al. | Jan. 17, 1956 |
| 2,795,564 | Conn et al. | June 11, 1957 |
| 2,809,122 | Willis et al. | Oct. 8, 1957 |
| 2,844,486 | Lamar | July 22, 1958 |

FOREIGN PATENTS

| | | |
|---|---|---|
| 358,535 | Great Britain | Sept. 21, 1931 |

OTHER REFERENCES

Johnson: "Flushed Colors," Canadian Paint and Varnish Magazine, December 1948, pages 10–12 and 49.

Hackh's Chemical Dictionary, Second Edition, 1937, page 913.